(12) United States Patent
Thomas

(10) Patent No.: US 6,411,881 B1
(45) Date of Patent: Jun. 25, 2002

(54) SYSTEM AND METHOD FOR CONTROLLING NEUTRAL IDLE OPERATION OF A VEHICLE

(75) Inventor: Joseph Lyle Thomas, Kimball, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/682,265

(22) Filed: Aug. 10, 2001

(51) Int. Cl.$^7$ ............................................. F16H 61/20
(52) U.S. Cl. ..................... 701/67; 701/48; 701/71; 701/83; 477/92; 477/93; 477/95; 180/69.6
(58) Field of Search ................ 701/67, 48, 51, 701/61, 64, 65, 71, 83, 94; 477/92, 93, 95; 180/69.6, 65.2, 165

(56) References Cited

U.S. PATENT DOCUMENTS

| | | |
|---|---|---|
| 4,514,811 A | 4/1985 | Daubenmier et al. |
| 5,692,990 A | 12/1997 | Tsukamoto et al. |
| 5,820,515 A * | 10/1998 | Fukaya et al. ................. 477/92 |
| 5,911,646 A | 6/1999 | Tsutsui et al. |

* cited by examiner

Primary Examiner—William A. Cuchlinski, Jr.
Assistant Examiner—Arthur D. Donnelly
(74) Attorney, Agent, or Firm—John F. Buckert; Allan J. Lippa

(57) ABSTRACT

A control system 32 and method for controlling neutral idle operation of a vehicle 10 is provided. The method includes measuring a brake pressure in a brake control line of vehicle 10. The control line communicates fluid to a brake 128 coupled to a wheel of vehicle 10. The method further includes determining an incline angle of vehicle 10. The method further includes determining a desired brake pressure based on the incline angle. The desired brake pressure is a pressure sufficient to allow the vehicle brakes to maintain vehicle 10 at a predetermined position. Finally, the method includes disengaging a transmission clutch 46 torsionally coupling a vehicle engine 12 to a wheel 24 when the measured brake pressure is greater than the desired brake pressure to initiate neutral idle operation.

21 Claims, 4 Drawing Sheets

SYSTEM AND METHOD FOR CONTROLLING NEUTRAL IDLE OPERATION OF A VEHICLE

BACKGROUND OF INVENTION

The invention relates to a control system and method for controlling neutral idle operation of a vehicle. More particularly, the invention relates a system and method that engages neutral idle operation when a brake system provides sufficient brake pressure to maintain a vehicle at a stopped position on a predetermined incline angle.

Automotive vehicles have internal combustion engines that generate torque that is transferred via a transmission to the vehicle wheels. In particular, transmissions such as continuously variable transmissions (CVT's) generally have a torque converter that is driven by an engine crankshaft. The torque converter is selectively coupled by a clutch (e.g., a forward or reverse clutch) to a variator. The variator transfers torque via final drive gears and a differential to the wheel axles. When the clutch is actuated, the torque converter (and the engine) is torsionally coupled to the variator (and the wheel axles). Alternately, when the clutch is de-actuated, the torque converter (and the engine) is torsionally de-coupled from the variator (and the wheel axles).

Conventional torque converters include an output impeller driven by the input turbine via hydraulic fluid. When a vehicle is stopped and the wheel brakes are actuated, the variator and an output impeller of the torque converter are stopped from the rotating. Thus, the engine crankshaft and turbine are allowed to rotate while being decoupled from the remainder of the drive train. However, during this time, fluid slip between the rotating turbine and the non-rotating impeller reduces engine efficiency and fuel economy.

Known vehicles have utilized neutral idle operation when the vehicle is stopped to increase engine efficiency and fuel economy. During neutral idle operation when the wheel brakes are actuated, a torque converter may be torsionally decoupled from the variator and the wheel axles via a transmission clutch. Thus, fluid slip between the turbine and impeller of the torque converter is reduced since the impeller is allowed to spin at approximately the same speed as the turbine. Further, the reduced fluid slip provides for a reduced load on the engine which increases engine efficiency and fuel economy.

One known neutral idle control system discloses engaging neutral idle operation of a vehicle while maintaining the vehicle at a fixed position i.e., without rollback on a hill. The control system determines an estimated incline of the road based on an acceleration of the vehicle prior to the vehicle stopping. Thereafter, the control system engages a transmission hill-hold brake which locks a gear shifter in the transmission to prevent rollback of the vehicle during neutral idle operation. A problem associated with the known control system is that the system cannot reliably maintain the vehicle on a hill incline during neutral idle operation by using the brake force of the wheel brakes alone. Instead the known control system utilizes an additional hill-hold brake in the transmission which increases transmission component costs, manufacturing costs, and warranty costs. Further, the known control system can only initiate neutral idle operation when the vehicle is on a level or uphill incline. Thus, the known control system does not engage neutral idle operation when the vehicle is stopped on a downhill incline which increases engine loading and decreases fuel economy.

SUMMARY OF INVENTION

The invention relates to a method and control system for controlling neutral idle operation of a vehicle that overcomes the above-identified problems and disadvantages of known control systems and methods. In particular, the method and control system can initiate neutral idle operation while maintaining a vehicle at a fixed position on either and uphill or downhill incline. Further, the method and control can maintain the position of the vehicle on an incline during neutral idle operation using only the vehicle wheel brakes.

The method and control system may be implemented in a vehicle having an engine coupled to a transmission. The transmission includes a first state torsionally disengaging the engine from a vehicle wheel to initiate neutral idle operation. The transmission further includes a second state torsionally engaging the engine to the wheel to end neutral idle operation.

The method for controlling neutral idle operation of the vehicle includes measuring a brake pressure in a brake control line. The control line communicates fluid to a brake coupled to a wheel of the vehicle. The method further includes determining an incline angle of the vehicle. The method further includes determining a desired brake pressure based on the incline angle. The desired brake pressure represents a brake pressure sufficient for the vehicle brakes to hold the vehicle at a fixed position on the incline angle. Finally, the method includes controlling an operational state of the clutch based on the measured brake pressure and the desired brake pressure while maintaining the vehicle at a predetermined position.

The control system for controlling neutral idle operation in a vehicle includes a pressure sensor generating a signal indicative of a brake pressure in a brake control line that communicates with a wheel of the vehicle. The control system further includes a sensor generating a signal indicative of an incline angle of the vehicle. The control system further includes a controller receiving the pressure signal and the incline angle signal. The controller is configured to determine a desired brake pressure based on the incline angle. The controller is further configured to control an operational state of the clutch based on the brake pressure signal and the desired brake pressure while maintaining the vehicle at a predetermined position.

DETAILED DESCRIPTION

Figure 1:
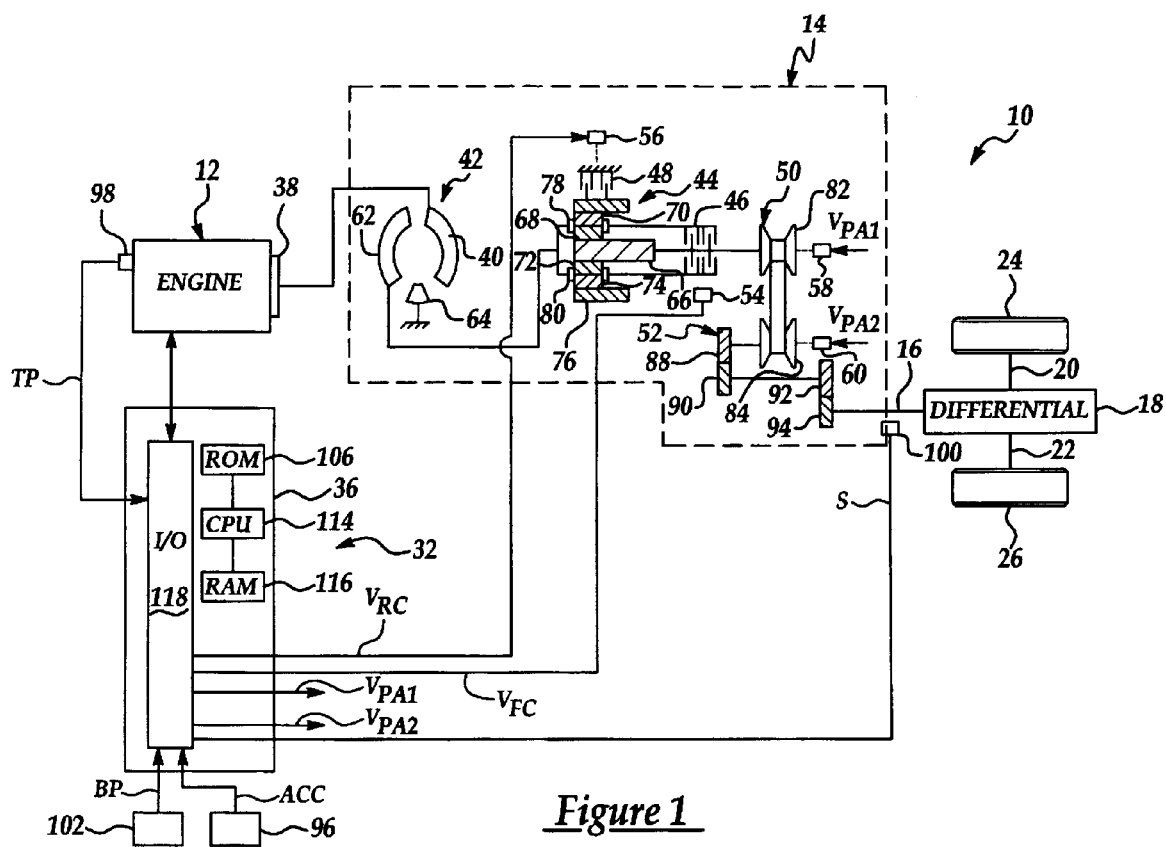
FIG. 1 is a schematic of an automotive vehicle having a control system in accordance with the present invention for controlling an engine and a transmission.
Figure 2:
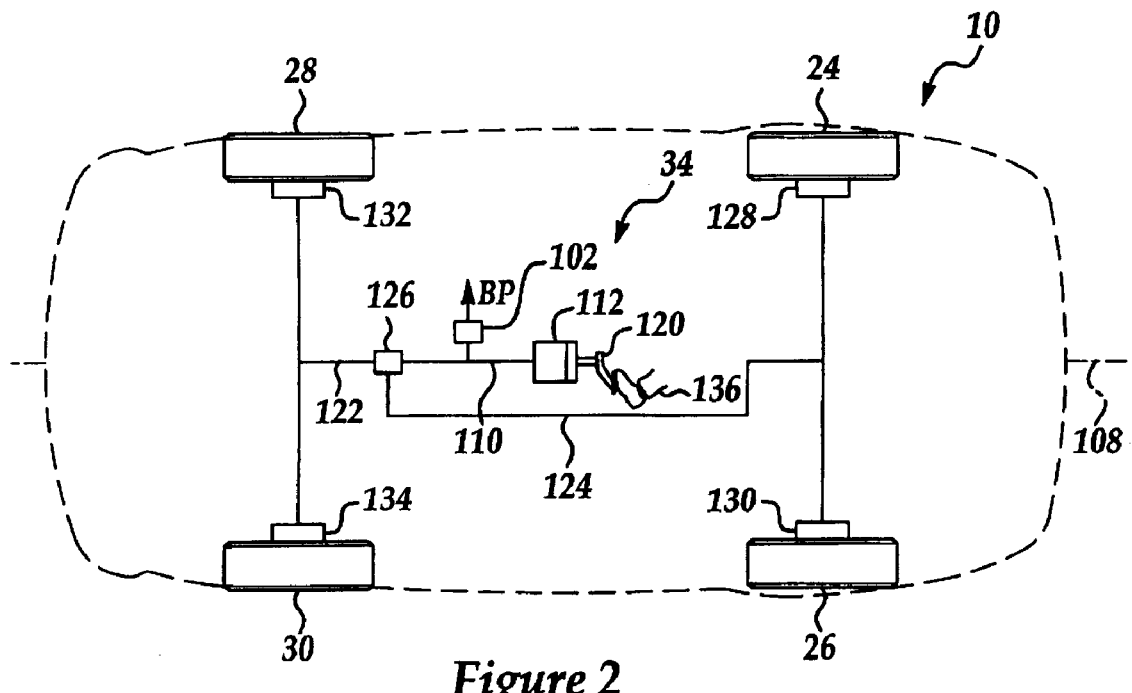
FIG. 2 is a schematic of an automotive vehicle brake system.

Referring now to the drawings, like reference numerals are used to identify identical components in the various views. Referring to FIGS. 1 and 2, an automotive vehicle 10 is shown having an engine 12, a transmission 14, a drive shaft 16, a differential 18, axles 20, 22, wheels 24, 26, 28, 30, a control system 32, and a brake system 34.

Referring to FIG. 1, internal combustion engine 12 is conventional in the art and may comprise a port-fuel injection engine or a direct injection engine operatively controlled by vehicle controller 36. Engine 12 includes a crankshaft 38 that torsionally drives a turbine 40 of transmission 14.

Transmission 14 is conventional in the art and may comprise a continuously variable transmission (CVT) or any other conventional automatic transmission. In the illustrated embodiment, a CVT is utilized. As will be discussed in further detail below, transmission 14 is utilized to initiate and end neutral idle operation of vehicle 10. As will be discussed in greater detail below, neutral idle operation will be initiated by dis-engaging a clutch 46 in transmission 14 to torsionally de-couple engine 12 from the vehicle wheels. Neutral idle operation will be ended by engaging clutch 46 to torsionally couple engine 12 to the vehicle wheels. Transmission 14 includes a torque converter 42, a planetary gear assembly 44, forward and reverse clutches 46, 48, a variator 50, a final drive gear assembly 52, and hydraulic actuators 54, 56, 58, 60.

Torque converter 42 is coupled between crankshaft 38 and planetary gear assembly 44 and transfers torque from engine 12 to the remainder of the drivetrain. Torque converter 42 includes an impeller 62, a turbine 40, and a torque multiplier 64. Turbine 40 transfers torque to impeller 62 and the planetary gear assembly 44 via hydraulic fluid as known to those skilled in the art.

Planetary gear assembly 44 transfers torque from impeller 62 to variator 50. Further, gear assembly 44 is utilized in conjunction with clutches 46, 48 to select either forward or reverse operation of vehicle 10. Gear assembly 44 includes a sun gear 66, pinion gears 68, 70, 72, 74, a ring gear 76, and carriers 78, 80. As shown, carrier 78 holds pinion gears 68, 70 operably between sun gear 66 and ring gear 76. Similarly, carrier 80 holds pinion gears 72, 74 operably between sun gear 66 and ring gear 76. When reverse clutch 48 is actuated in response to signal ($V_{RC}$) from controller 36 being received by actuator 56 (and the forward clutch 46 is not actuated), the sun gear 66 rotates in a direction opposite the direction of carriers 78, 80 and impeller 62. Thus, torque from engine 12 is applied in a reverse rotational direction to wheels 24, 26. Alternately, when forward clutch 46 is actuated in response to signal ($V_{FC}$) from controller 36 being received by actuator 54 (and the reverse clutch 48 is not actuated), the sun gear 66 rotates in the same direction as the carriers 78, 80 and impeller 62. Thus, torque from engine 12 is applied in a forward rotational direction to wheels 24, 26.

Forward and rearward clutches 46, 48 are conventional in the art and are actuated to apply torque in forward or reverse rotational directions, respectively, to wheels 24, 26. As illustrated, clutches 46, 48 are controlled via hydraulic actuators 54, 56 respectively, responsive to signals ($V_{RC}$), ($V_{FC}$), respectively. As described in more detail below, forward clutch 46 may be utilized to initiate neutral idle operation when de-actuated and to end neutral idle operation when actuated. It should be understood, however, that clutches other than clutch 46 could be utilized to initiate and end neutral idle operation. For example, a coast clutch (not shown) torsionally coupled between impeller 62 and planetary gear assembly 44 could be utilized to initiate and end neutral idle operation. Variator 50 is provided to variably change the gear ratio of transmission 14. As illustrated, variator 50 includes a drive pulley 82, a driven pulley 84, and a drive belt 86 coupled between pulleys 82, 84. Variator 50 is coupled between planetary gear assembly 44 and final gear assembly 52, and in particular, pulley 82 is coupled to sun gear 66 and pulley 84 is coupled to the gear 88 of assembly 52. During operation, controller 36 selectively changes the diameter of pulleys 82, 84 to change the gear ratio of transmission 14. The diameter of pulley 82 is adjusted by hydraulic actuator 58 responsive to signal ($V_{PA1}$) received from controller 36. Similarly, the diameter of pulley 84 is adjusted by actuator 60 responsive to signal $V_{PA2}$ received from controller 36. The gear ratio is increased by increasing the diameter of pulley 82 while simultaneously decreasing the diameter of pulley 84. Alternately, the gear ratio is decreased by decreasing the diameter of pulley 82 while simultaneously increasing the diameter of pulley 84.

The final drive gear assembly 52 includes drive gears 88, 90, 92, 94 and is conventional in the art. As illustrated, gear 88 is coupled to driven pulley 84 and transmits torque from pulley 84 to gear 90 which further transmits torque through gears 92, 94. It should be understood that other gear configurations could be alternately used in assembly 52 to select a desired gear ratio. Gear 94 has an output shaft coupled to drive shaft 16.

Differential 18 is conventional in the art and transmits torque from final drive gear assembly 52 to the axles 20, 22 (and wheels 24, 26). As illustrated, wheels 24, 26 are rear wheels of vehicle 10. It should be understood, however, that final drive gear assembly 52 could be configured to drive front wheels 28, 30.

The vehicle control system 32 includes an accelerometer 96, a throttle position sensor 98, a speed sensor 100, a brake pressure sensor 102, and vehicle controller 36.

Figure 3:
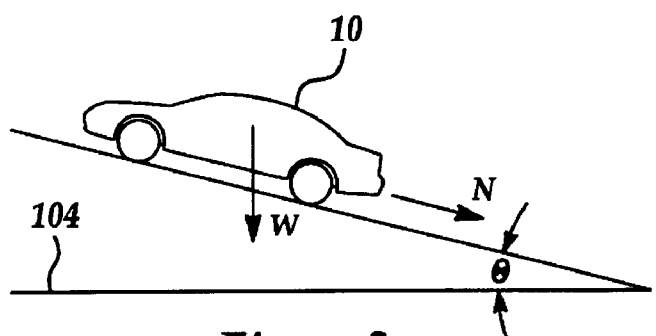
FIG. 3 is a schematic of a vehicle being disposed on an uphill incline and the associated gravitational force acting on the vehicle.
Figure 4:
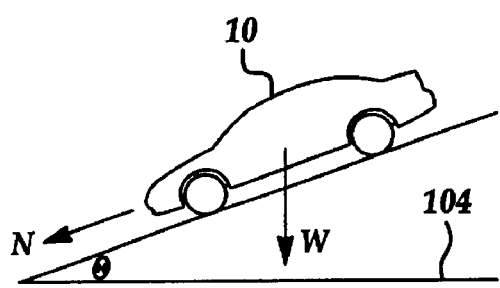
FIG. 4 is a schematic of a vehicle being disposed on a downhill incline and the associated gravitational force acting on the vehicle.
Figure 7:
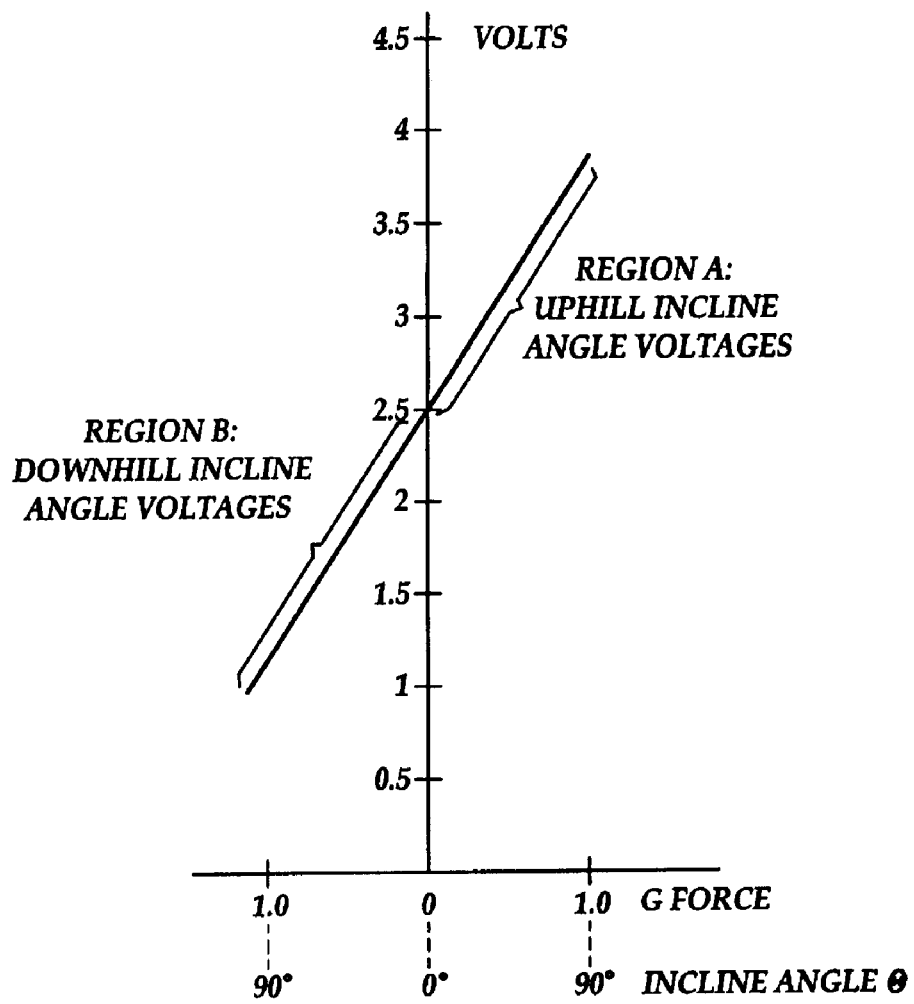
FIG. 7 is a graph of an accelerometer output voltage that is indicative of an incline angle of a vehicle when the vehicle is stopped.

Referring to FIGS. 1 and 3, accelerometer 96 generates a signal (ACC) indicative of an incline angle θ of vehicle 10 with respect to level reference plane 104. Referring to FIG. 7, a linear relationship is shown between the voltage of signal (ACC) and the amount of G force exerted on sensor 96. Similarly, a linear relationship is shown between the voltage of signal (ACC) and the incline angle θ. As illustrated, the voltages of signal (ACC) defined by region A, correspond to uphill incline angles ranging from 0 to 90°. Similarly, the voltages defined by region B, correspond to downhill incline angles ranging from 0 to 90°. Thus, a first look-up table stored in ROM 106 of microcontroller 36 may be utilized having stored voltage values of signal (ACC) and corresponding stored values of incline angles θ, to represent the linear relationship shown in FIG. 7. Thus, when vehicle 10 is stopped and controller 36 receives signal (ACC) from accelerometer 96, controller 36 may use the measured value of signal (ACC) as an index to access a corresponding incline angle θ in the first look-up table. Referring to FIG. 2, a longitudinal axis of accelerometer 96 may be oriented parallel to longitudinal vehicle axis 108 to a measure the pitch or incline angle θ of vehicle 10. As will be explained in greater detail below, the incline angle θ will be utilized by controller 36 to determine a desired brake pressure for holding vehicle 10 at a stationary position during neutral idle operation.

Referring to FIG. 1, the throttle position sensor 98 generates a signal indicating a throttle position (TP) of a throttle plate (not shown) in an intake manifold of engine 12. As illustrated, the signal (TP) is transmitted to controller 36.

Speed sensor 100 generates a signal (S) indicative of vehicle speed that is received by controller 36. Speed sensor 100 may measure the speed of drive shaft 16 or one of the gears in final drive gear assembly 52. Speed sensor 100 is conventional in the art and may comprise either a variable reluctance sensor or a hall effect sensor.

Referring to FIG. 2, pressure sensor 102 is conventional in the art and generates a brake pressure signal (BP) indicative of brake pressure in a hydraulic control line 110 downstream of master cylinder 112. It should be understood, however, that pressure sensor 102 may be placed in a plurality of other positions in brake system 34 downstream of master cylinder 112. For example, sensor 102 may be operably disposed downstream of a vacuum booster (not shown) that increases the hydraulic pressure from master cylinder 112. Still further, for example, sensor 102 could be disposed in either of control lines 122, 124. As illustrated, sensor 102 transmits signal (BP) to controller 36.

Referring to FIG. 1, the vehicle controller 36 is provided to control transmission 14 for initiating and ending neutral idle operation of vehicle 10 in accordance with the present invention. The method for controlling neutral idle operation will be discussed in further detail below. The controller 36 includes a microprocessor 114 communicating with various computer-readable storage media. The computer readable storage media preferably include nonvolatile and volatile storage in a read-only memory (ROM) 106 and a random-access memory (RAM) 116, respectively. The computer readable media may be implemented using any of a number of known memory devices such as PROMs, EPROMs, EEPROMs, flash memory or any other electric, magnetic, optical or combination memory device capable of storing data, some of which represent executable instructions, used by the microprocessor 114 in controlling engine 12 and transmission 14. Microprocessor 114 communicates with various sensors and actuators (discussed above) via an input/output (I/O) interface 118. Of course, the present invention could utilize more than one physical controller to provide engine/transmission control depending upon the particular application.

Referring to FIG. 2, the brake system 34 is provided to allow an operator to selectively control braking of vehicle 10. The system 34 includes a brake pedal 120, master cylinder 112, hydraulic fluid lines 110, 122, 124, a proportioning valve 126, brakes 128, 130, 132, 134. As shown, an operator 136 may depress brake pedal 120 which causes the master cylinder 112 to displace hydraulic fluid through line 110 to valve 126. Valve 126 distributes fluid through lines 122, 124 to front brakes 132, 134 and rear brakes 128, 130, respectively, to actuate brakes 128, 130, 132, 134. Those skilled in the art will recognize that the brake pressure applied to brakes 128, 130, 132, 134 is proportional to the braking force applied to wheels 24, 26, 28, 30 respectively.

Figure 6:
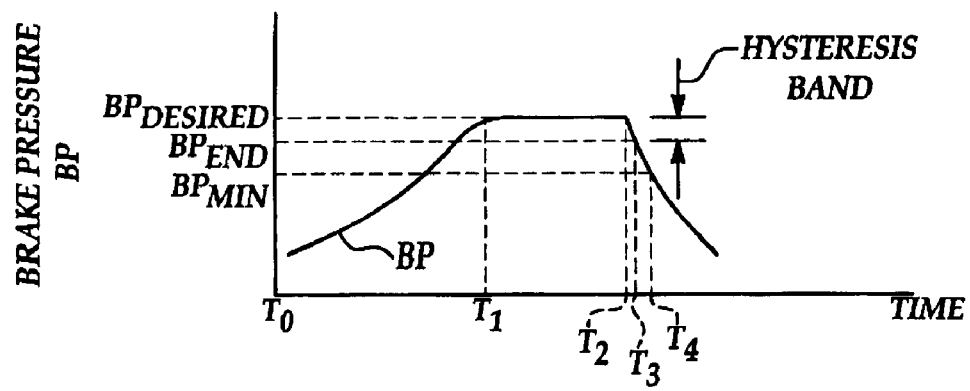
FIG. 6 is a graph illustrating brake pressure versus time in the brake system illustrated in FIG. 2.

Referring to FIG. 6, before providing a detailed description of the method for controlling neutral idle operation, a discussion of a response curve for brake pressure (BP) will be discussed as utilized by the inventive method. As shown, at time $T_0$, the operator 136 depresses brake pedal 120 causing measured brake pressure (BP) to increase. At time $T_1$, measured brake pressure (BP) becomes greater than or equal to pressure ($BP_{DESIRED}$), and in response, the controller 36 initiates neutral idle operation by disengaging clutch 46. The desired brake pressure ($BP_{DESIRED}$) is set to a value (depending on incline angle θ) that allows brakes 128, 130, 132, 134 to maintain vehicle 10 at a stationary position on incline angle θ during neutral idle operation. At time $T_2$, the operator 136 releases brake pedal 120 and the brake pressure (BP) begins to decrease. At $T_3$, when the pressure (BP) becomes less than ($BP_{END}$) (i.e., BP<$BP_{DESIRED}$—hysteresis band). In response, the controller 36 sends a signal to actuator 54 to engage clutch 46 to end neutral idle operation. The hysteresis band is utilized to prevent controller 36 from iteratively jumping between initiating and ending neutral idle operation when brake pressure (BP) fluctuates closely around pressure ($BP_{DESIRED}$). Referring again to FIG. 6, pressure ($BP_{MIN}$) corresponds to a minimum brake pressure that can maintain vehicle 10 at a stationary position on incline angle θ. Thus, desired brake pressure ($BP_{DESIRED}$) is preferably larger than pressure ($BP_{DESIRED}$). At time $T_4$, when pressure (BP) is less than ($BP_{MIN}$), clutch 46 is fully actuated (engaged) and torsionally connects engine 12 to wheels 24, 26, 28, 30. The time period $T_3$–$T_4$ corresponds to a time interval that is less than or equal to a required minimum time interval to mechanically engage clutch 46.

The method for determining the minimum hill-hold pressure ($BP_{MIN}$) and the desired hill-hold brake pressure ($BP_{DESIRED}$) will now be discussed. In particular, the minimum hill-hold pressure ($BP_{MIN}$) can be empirically determined for each incline angle θ of vehicle 10, in order to maintain vehicle 10 at a stationary position during neutral idle operation. As illustrated in FIG. 6, the pressure ($BP_{DESIRED}$) can be set to a value greater than the minimum hill-hold pressure ($BP_{MIN}$) to prevent any roll-back or roll-forward motion of vehicle 10. For example, the desired hill-hold brake pressure ($BP_{DESIRED}$) may be set between 1–10 PSI above a corresponding value of minimum hill-hold pressure ($BP_{MIN}$) for a given incline angle θ. The values for desired brake pressure ($BP_{DESIRED}$) may be stored in a second look-up table (not shown) in ROM 106 along with corresponding values of a force vector (N) representing a vector component of weight (W) pushing vehicle 10 along incline angle θ. When vehicle 10 is stationary, the controller 36 can calculate the force vector (N) using the following formula:

$$N = W / \text{SIN}(\theta).$$

Thereafter, the controller 36 can use the value (N) as a table index to determine a corresponding pressure ($BP_{DESIRED}$) from the second look-up table stored in ROM 106. Alternately, the desired brake pressure ($BP_{DESIRED}$) can be calculated as a function of brake pressure (BP), brake rotor diameter, and a coefficient of friction of the rotor and brake pads of brakes 128, 130, 132, 134. The method for determining operational values for the pressure ($BP_{END}$) corresponding to a brake pressure when controller 36 ends neutral idle operation, will now be discussed. In particular, pressure ($BP_{END}$) should be set based on the mechanical actuation time of clutch 46. The actuation time of a conventional clutch may be found in the clutch specifications supplied by the manufacturer or may be empirically determined. In particular, after an operator 136 has released brake pedal 120, the time interval to engage clutch 46 should be less than or equal to a time required for the brake pressure (BP) to fall from pressure ($P_{END}$) pressure ($P_{MIN}$) to maintain vehicle 10 at a stationary position. In other words, because the clutch 46 must be fully actuated by time $T_4$ (when brake pressure equals $BP_{MIN}$) the time (e.g., $T_3$) and corresponding pressure ($BP_{END}$) for commencing actuation of clutch 46 may be determined based on a known rate of decrease of brake pressure (BP), and the known actuation time of clutch 46. Referring to FIG. 6, the known actuation time of clutch 46 is preferably less than or equal to the time interval $T_3$–$T_4$. The values for brake pressure ($BP_{END}$) may be stored in a third look-up table (not shown) in ROM 106 along with corresponding values of a calculated force vector (N). Thus, controller 36 can use the calculated value (N) as a table index to determine a corresponding pressure (BP END ) from the third look-up table stored in ROM 106.

Figure 5:
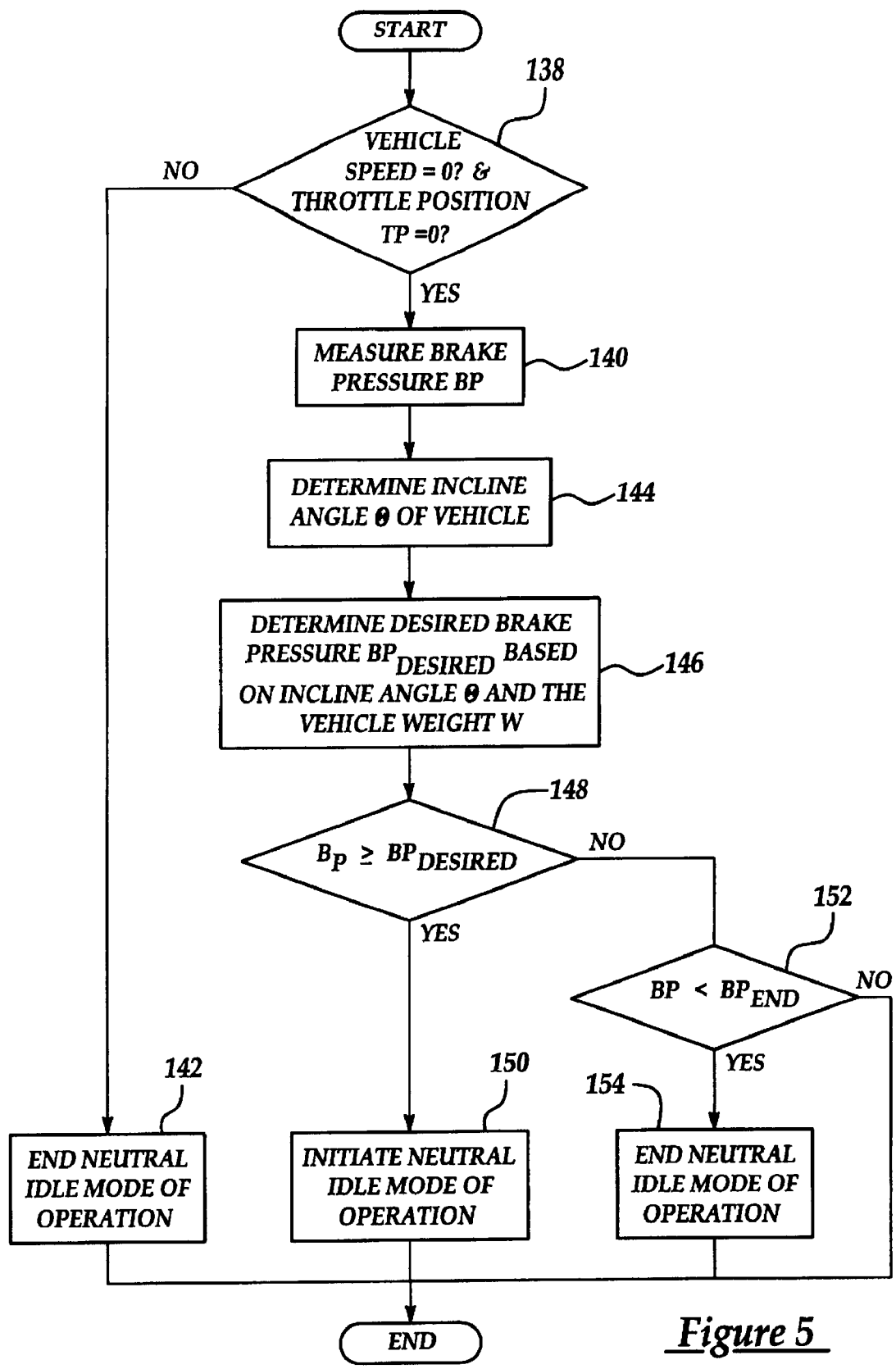
FIG. 5 is a flowchart of a method of controlling neutral idle operation of a vehicle in accordance with the present invention.

Referring to FIG. 5, a method for controlling neutral idle operation in vehicle 10 in accordance with the present invention is provided. The method may be implemented in software stored in ROM 106 of controller 36. Those skilled in the art will recognize that the method may be iteratively performed as a background loop in controller 36 at predetermined time intervals.

The method includes a step 138 which determines whether the vehicle has stopped (i.e., vehicle speed=0) and whether throttle position (TP) of a throttle valve (not shown) is in a closed position. As previously discussed, vehicle speed may be determined by controller 36 from signal (S) and the throttle position from signal (TP). Thus, the step 138 verifies that vehicle 10 is at a stationary position and the operator is not demanding increased torque from the engine 12. If the answer to step 138 is YES, the step 140 is performed. Otherwise, the method advances to step 142 where neutral idle operation is ended by engaging clutch 46.

At step 140, the current brake pressure is measured. As previously discussed, the brake pressure signal (BP) may be utilized by the controller 36 to determine the current brake pressure. After step 140, the method advances to step 144.

At step 144, the incline angle θ of vehicle 10 is determined. As previously discussed, the acceleration signal (ACC) may be utilized by controller 36 to determine incline angle θ. In particular, controller 36 can utilize a value of signal (ACC) as an index to access a corresponding incline angle θ. in the first look-up table. After step 144, the method advances to step 146.

At step 146, a desired brake pressure $BP_{DESIRED}$ is determined based on the incline angle θ and the vehicle weight (W). As previously discussed, the pressure $BP_{DESIRED}$ may be determined from the second look-up table containing a plurality of pressures ($BP_{DESIRED}$) indexed by the force vector (N). Further, as discussed above, the force vector (N) may be determined by controller 36 using the vehicle weight (W) and incline angle θ of vehicle 10. After step 146, the method advances to step 148.

At step 148, a determination is made as to whether the brake pressure (BP) is greater than or equal to desired hill-hold brake pressure ($BP_{DESIRED}$) If the value of step 148 equals YES, the method advances to step 150 where neutral idle operation is initiated by disengaging clutch 46.

Continuing with step 148, if the value of step 148 equals NO, the method advances to step 152 where a determination is made as to whether brake pressure (BP) is less than pressure ($BP_{END}$). If the value of step 152 equals YES, then the method advances to step 154 where neutral idle operation is ended by engaging clutch 46. Otherwise, if the value of step 152 equals NO, neutral idle operation is continued.

The control system 32 and method for controlling neutral idle operation of vehicle 10 in accordance with the present invention represents a substantial advantage over known systems and methods. In particular, the method and control system can initiate neutral idle operation while maintaining a vehicle at a fixed position on either an uphill or downhill incline. Further, the method and control can maintain the position of the vehicle using only the vehicle wheel brakes based on a measured vehicle incline.

What is claimed is:

1. A method for controlling neutral idle operation of a vehicle, said vehicle having an engine coupled to a transmission, said transmission including a clutch having a first state torsionally disengaging said engine from a vehicle wheel to initiate neutral idle operation and a second state torsionally engaging said engine to said wheel to end neutral idle operation, said method comprising:

measuring a brake pressure in a brake control line, said control line communicating fluid to a brake coupled to said wheel of said vehicle;

determining an incline angle of said vehicle, said incline angle corresponding to both a downhill incline angle and an uphill incline angle;

determining a desired brake pressure based on said incline angle; and, controlling an operational state of said clutch based on said measured brake pressure and said desired brake pressure while maintaining said vehicle at a predetermined position.

2. The method of claim 1 wherein said step of determining said incline angle includes measuring a signal generated by an accelerometer disposed on said vehicle.

3. The method of claim 1 wherein said incline angle corresponds to one of a downhill incline angle and an uphill incline angle.

4. The method of claim 1 wherein said step of determining said desired brake pressure includes:

determining a magnitude of a gravitational force exerted on said vehicle along said incline angle based on said vehicle weight and said incline angle; and, determining said desired brake pressure based on said magnitude of said force.

5. The method of claim 1 wherein said desired brake pressure corresponds to a pressure value that enables said brake to maintain said vehicle at said predetermined position during said neutral idle operation of said vehicle.

6. The method of claim 1 wherein said controlling step further includes:

comparing said measured brake pressure to said desired brake pressure; and, disengaging said clutch when said measured brake pressure is greater than said desired brake pressure to enable neutral idle operation of said vehicle.

7. The method of claim 1 wherein said controlling step further includes:

comparing said measured brake pressure to said desired brake pressure; and, engaging said clutch when said measured brake pressure is less than said desired brake pressure minus a predetermined hysteresis value to end neutral idle operation of said engine.

8. The method of claim 1 further including determining when said vehicle has stopped forward or rearward movement.

9. The method of claim 1 further including:

determining whether said vehicle is moving; and, engaging said clutch when said vehicle is moving to end neutral idle operation of said vehicle.

10. A control system for controlling neutral idle operation of a vehicle, said vehicle having an engine coupled to a transmission, said transmission including a clutch having a first state torsionally disengaging said engine from a vehicle wheel to initiate neutral idle operation and a second state torsionally engaging said engine to said wheel to end neutral idle operation, comprising:

a pressure sensor generating a signal indicative of a brake pressure in a brake control line, said line communicating fluid to a brake coupled to said wheel of said vehicle;

a sensor generating a signal indicative of an incline angle of said vehicle, said incline angle corresponding to both a downhill incline angle and an uphill incline angle; and, a controller receiving said pressure signal and said incline angle signal, said controller configured to determine a desired brake pressure based on said incline angle, said controller being further configured to control an operational state of said clutch based on said brake pressure signal and said desired brake pressure while maintaining said vehicle at a predetermined position.

11. The control system of claim 10 wherein said sensor for generating said signal indicative of said incline angle comprises an accelerometer.

12. The control system of claim 10 wherein said accelerometer is disposed lengthwise along a longitudinal axis of said vehicle.

13. The control system of claim 10 further including a sensor for generating a signal indicative of a speed of said vehicle, said speed signal being transmitted to said controller.

14. An article of manufacture comprising:

a computer storage medium having a computer program encoded therein for controlling neutral idle operation of a vehicle, said vehicle having an engine coupled to a transmission, said transmission including a clutch having a first state torsionally disengaging said engine from a vehicle wheel to initiate neutral idle operation and a second state torsionally engaging said engine to said wheel to end neutral idle operation, said computer storage medium comprising:

code for receiving a signal indicative of a breake pressure in a brake control line communicating fluid to a break coupled to said wheel of said vehicle;

code for determining a desired brake pressure based on said incline angle, said incline angle corresponding to both a downhill incline angle and an uphill incline angle; and, code for controlling an operational state of said clutch of said transmission based on said brake pressure signal and said desired brake pressure while maintaining said vehicle at a predetermined position.

15. The article of manufacture of claim 14 wherein said computer storage medium further includes:

code for determining a magnitude of a gravitational force exerted on said vehicle along said incline angle based on said vehicle weight and said incline angle; and, code for determining said desired brake pressure based on said magnitude of said force.

16. The article of manufacture of claim 14 wherein said computer storage medium further includes:

code for comparing said measured brake pressure to said desired brake pressure; and, code for disengaging said clutch when said measured brake pressure is greater than said desired brake pressure to enable neutral idle operation of said vehicle.

17. The article of manufacture of claim 14 wherein said computer storage medium further includes:

code for comparing said measured brake pressure to said desired brake pressure; and, code for engaging said clutch when said measured brake pressure is less than said desired brake pressure minus a predetermined hysteresis value to end neutral idle operation of said vehicle.

18. The article of manufacture of claim 14 wherein said computer storage medium further includes:

code for receiving a signal indicative of a speed of said vehicle; and, code for engaging said clutch when said vehicle speed is greater than a predetermined value to end neutral idle operation of said vehicle.

19. A method for controlling neutral idle operation of a vehicle, the vehicle having an engine coupled to a transmission, the transmission including a clutch having a first state torsionally disengaging the engine from a vehicle wheel to initiate neutral idle operation and a second state torsionally engaging the engine to the wheel to end neutral idle operation, the method comprising:

determining an incline angle of said vehicle;

determining a desired brake pressure based on said incline angle to maintain said vehicle at a stationary position; and, controlling an operational state of said clutch based on a pressure applied to a brake coupled to said vehicle wheel and said desired brake pressure.

20. The method of claim 19 wherein said controlling step includes:

disengaging said clutch when said pressure applied to said wheel brake is greater than said desired brake pressure to start neutral idle operation of said vehicle.

21. The method of claim 19 wherein said controlling step includes:

engaging said clutch when said pressure applied to said wheel brake is less than said desired brake pressure to end neutral idle operation said vehicle.

* * * * *